(12) United States Patent
Poisner

(10) Patent No.: US 7,017,062 B2
(45) Date of Patent: Mar. 21, 2006

(54) METHOD AND APPARATUS FOR RECOVERING FROM AN OVERHEATED MICROPROCESSOR

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 09/751,601

(22) Filed: Dec. 29, 2000

(65) Prior Publication Data
US 2002/0087907 A1 Jul. 4, 2002

(51) Int. Cl.
G06F 1/30 (2006.01)
G06F 1/26 (2006.01)
G06F 11/00 (2006.01)

(52) U.S. Cl. .......................... 713/340; 713/320; 714/23

(58) Field of Classification Search ................. 713/340, 713/300, 323, 321, 320, 324; 714/23, 36
See application file for complete search history.

(56) References Cited

U.S. PATENT DOCUMENTS

| | | | | |
|---|---|---|---|---|
| 5,590,061 A | * | 12/1996 | Hollowell et al. | 702/130 |
| 5,719,800 A | * | 2/1998 | Mittal et al. | 713/321 |
| 6,101,610 A | * | 8/2000 | Beebe et al. | 713/323 |
| 6,134,667 A | * | 10/2000 | Suzuki et al. | 713/300 |
| 6,363,490 B1 | * | 3/2002 | Senyk | 713/300 |
| 6,493,827 B1 | * | 12/2002 | Mueller et al. | 713/300 |
| 6,522,535 B1 | * | 2/2003 | Helot et al. | 361/687 |
| 6,640,316 B1 | * | 10/2003 | Martin et al. | 714/36 |
| 6,674,623 B1 | * | 1/2004 | Abe et al. | 361/103 |

FOREIGN PATENT DOCUMENTS

JP 10293627 A * 11/1998

OTHER PUBLICATIONS

Sanchez et al, Thermal Management System for High Performance PowerPC Microprocessors, 1997 IEEE, pp. 325–330.*

* cited by examiner

Primary Examiner—Rehana Perveen
Assistant Examiner—Suresh Suryawanshi
(74) Attorney, Agent, or Firm—Blakely, Sokoloff, Taylor & Zaffman LLP

(57) ABSTRACT

One embodiment of a system for recovering from an overheated processor includes a processor that asserts a thermal trip signal when the internal temperature of the processor exceeds a maximum acceptable limit. A power management device asserts a power off signal to a voltage regulator module in response to the assertion of the thermal trip signal by the processor. The voltage regulator module removes power from the processor in response to the assertion of the power off signal by the power management device.

13 Claims, 2 Drawing Sheets

US 7,017,062 B2

METHOD AND APPARATUS FOR RECOVERING FROM AN OVERHEATED MICROPROCESSOR

FIELD OF THE INVENTION

The present invention pertains to the field of computer systems. More particularly, this invention pertains to the field of recovering from overheated microprocessors.

BACKGROUND OF THE INVENTION

Today's microprocessors typically use cooling fans mounted to the processor package to ensure that the processor continues to operate within acceptable temperature limits. If the cooling fan should ever fail, or if other circumstances arise that cause the internal temperature of the processor to exceed a maximum acceptable limit, then a typical processor will assert a thermal trip signal that indicates to the rest of the computer system that the processor has overheated. The processor will then enter a halt state and system operation will cease.

A problem may arise as processors are manufactured with smaller and smaller transistor dimensions. As transistor dimensions decrease, the leakage currents increase dramatically. In the case discussed above where a processor has entered a halt state following an assertion of the thermal trip signal, if the leakage currents of the processor exceed the ability of the processor package to dissipate heat, then the processor's die temperature will continue to increase. As the die temperature increases, the leakage currents increase even more. This spiral continues until the temperature increases to the point where the circuits on the die are damaged.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

One embodiment of a system for recovering from an overheated processor includes a processor that asserts a thermal trip signal when the internal temperature of the processor exceeds a maximum acceptable limit. A power management device asserts a power off signal to a voltage regulator module in response to the assertion of the thermal trip signal by the processor. The voltage regulator module removes power from the processor in response to the assertion of the power off signal by the power management device.

Figure 1:
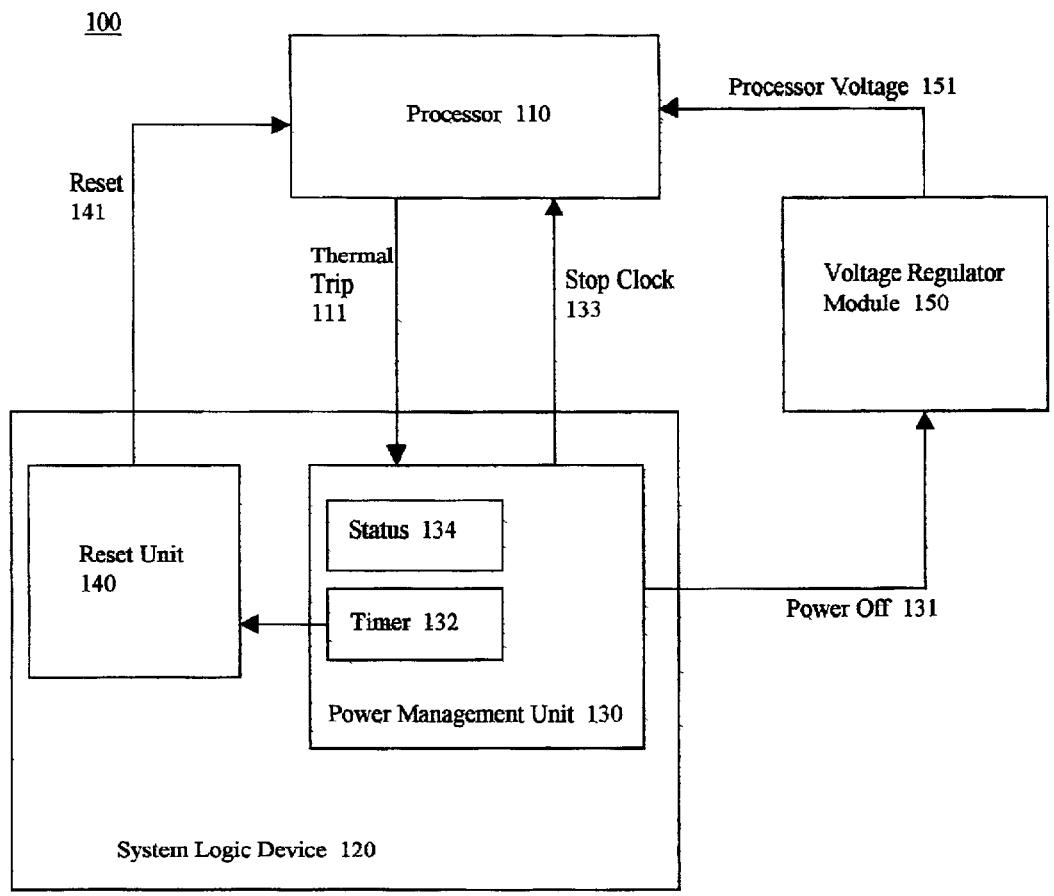
FIG. 1 is a block diagram of a system implemented in accordance with one embodiment of the invention.

FIG. 1 is a block diagram of a computer system 100. The system 100 includes a processor 110. The processor 110 may include a cooling fan (not shown) coupled to the processor package. The processor 110 receives its power from a voltage regulator module 150. The delivery of power in this embodiment is designated by a processor voltage line 151. The processor 110 has an internal thermal sensor. If the cooling fan fails, the processor 110 may overheat. When the internal temperature of the processor 110 exceeds a maximum acceptable limit, the processor 110 asserts a thermal trip signal 111 that communicates to the remainder of the system that the processor is in an overheated condition. The processor 110 also enters a halt state where the processor ceases to execute instructions.

The thermal trip signal 111 is delivered to a system logic device 120. The system logic device 120 includes a reset unit 140 and a power management unit 130. The power management unit 130 receives the thermal trip signal 111. In response to the assertion of the thermal trip signal 111, the power management unit 130 asserts a power off signal 131. The power off signal 131 is received by the voltage regulator module 150. In response to the assertion of the power off signal 131, the voltage regulator module 150 ceases to deliver power to the processor 110. By removing power from the processor 110, the processor 110 will not continue to increase in temperature due to leakage currents as may otherwise occur if the power were to continue to be delivered to the processor 110.

At some point after the assertion of the thermal trip signal 111, the power management unit 130 starts a timer 132 and sets a status bit 134. The timer 132 may be programmable. When the timer 132 expires, the reset unit 140 asserts a reset signal 141 to the processor 110. The power off signal 131 is deasserted and the voltage regulator module 150 begins to again deliver power to the processor 110.

After restarting the processor 110, the power management unit 130 will take steps to keep the processor's heat generation to a minimum. In one embodiment, the power management unit 130 periodically asserts a stop clock signal 133. The stop clock signal 133, when asserted, causes the processor 110 to temporarily cease to execute instructions. Therefore, a periodic assertion of the stop clock signal 133 effectively slows down the processor 110 so that less power is consumed and less heat is generated. This technique is commonly referred to as "clock throttling."

In another embodiment, the processor 110 is restarted to run at a lower frequency, and thus generate less heat. By running at a lower frequency, the voltage to the CPU can also be reduced.

An additional embodiment includes running the processor 110 at a lower frequency and at a lower voltage, as well as throttling the clock to reduce the instruction rate.

By restarting the processor 110 in a manner that consumes less power, the processor 110 can continue to perform critical tasks. The processor 110 may also be able to deliver a failure message to a network administrator if the computer system 100 is incorporated into a network environment. The status bit 134 is used to indicate to the computer system basic input/output system (BIOS) software the reason for the system reset.

It is possible that even with the clock throttling the processor 110 may again overheat. In this case, the process described above is repeated. Some embodiments may track the number of times the processor is reset due to overheating. When a maximum number of resets has occurred, the power management unit 130 will cease to reset the processor and will keep the power off signal 131 asserted.

The response to successive overheat conditions may be increasingly drastic responses. For example, after the first overheat, the processor 110 may be restarted with clock throttling, but at full voltage and frequency. If a subsequent overheat occurs, then the processor may be restarted with clock throttling and voltage reduction and frequency reduction.

The timer 132 can be programmed with a value that will give the processor 110 time to cool off before the reset unit 140 resets the processor 110. Some embodiments may allow the BIOS to program the timer 132. The timer 132 may be reprogrammed to different values between each reset, if desired. Other embodiments are possible that use temperature measurements instead of a timer to determine when to reset the processor 110.

Although the example embodiment of system 100 describes the power management unit 131 as being integrated into a system logic device, other embodiments are possible where the power management unit 130 is either integrated into other system devices or is implemented as a discrete device.

Further, although the example embodiment of system 100 includes a voltage regulator module that delivers power to the processor 110, other embodiments are possible using a wide range of devices that are capable of delivering power to a processor. Also, although the system 100 indicates that a single voltage line is applied to the processor 110, other embodiments are possible where more than one voltage is applied to the processor. For example, the processor core may receive one voltage and the processor input/output ring may receive a second voltage.

Figure 2:
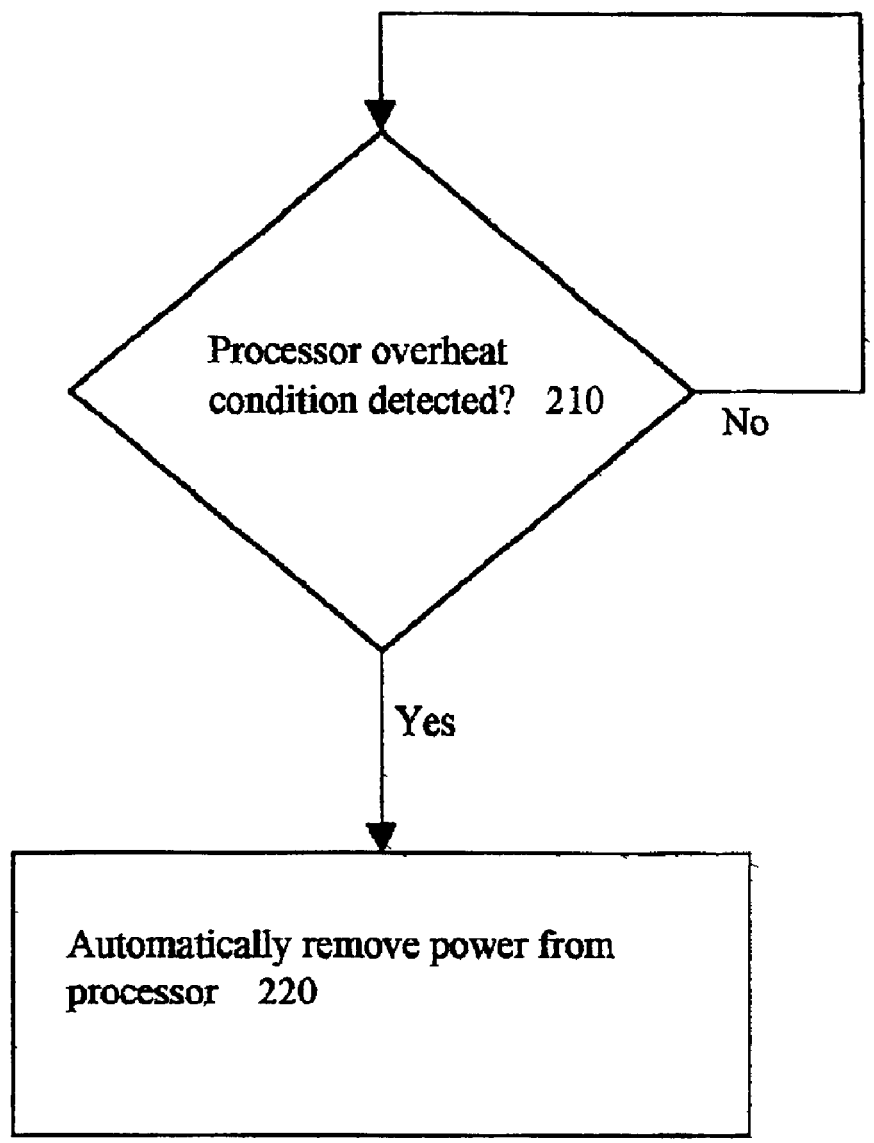
FIG. 2 is a flow diagram of one embodiment of a method for recovering from an overheated processor.

FIG. 2 is a flow diagram of one embodiment of a method for recovering from an overheated processor. At block 210, a determination is made as to whether a processor overheat condition has been detected. If an overheat condition is detected, then at block 220 power is automatically removed from the processor. The term "automatically" as used herein is meant to indicate that no human interaction is necessary. The removal of power from the processor allows the processor to cool, thereby avoiding damaging the processor die. As described above in connection with FIG. 1, other embodiments are possible where the processor is reset and is allowed to operate at a reduced power level in an attempt to avoid further overheat conditions and to give the processor time to send messages to network administrators or to complete critical applications.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A method, comprising:
   detecting that a processor is overheated;
   asserting a thermal trip signal from the processor;
   causing the processor to enter a halt state;
   automatically removing power from the processor; and
   throttling the processor by periodically asserting a stop clock signal following a computer system reboot.

2. The method of claim 1, further comprising rebooting a computer system, the computer system including the processor.

3. The method of claim 2, further comprising applying a reduced voltage to the processor during and subsequent to the reboot.

4. The method of claim 1, wherein rebooting the computer system includes rebooting the computer system after a predetermined period of time following the detection of the overheated condition.

5. The method of claim 1, wherein rebooting the computer system includes rebooting the computer system after the processor has cooled to a predetermined temperature.

6. The method of claim 1, further comprising:
   detecting for a second time that the processor is overheated;
   automatically removing power from the processor for a second time; and
   again rebooting the computer system.

7. An apparatus, comprising:
   a processor interface unit to monitor a thermal trip signal from a processor; and
   a voltage regulator module interface to assert a power off signal to a voltage regulator module in response to an assertion of the thermal trip signal,
   wherein the processor interface throttles the processor by periodically asserting a stop clock signal in response to a system reboot following the assertion of the thermal trip signal.

8. The apparatus of claim 7, further including a status bit that is set in response to the assertion of the thermal trip signal, the status bit to indicate that the system reboot is in response to the assertion of the thermal trip signal.

9. A system, comprising:
   a processor including a thermal trip signal output that is asserted in response to an overheat condition;
   a power management device to receive the thermal trip signal, the power management device to assert a power off signal in response to an assertion of the thermal trip signal and to throttle the processor by periodically asserting a stop clock signal during and following a system reset; and
   a power supply device to deliver power to the processor, the power supply device to receive the power off signal and to cease to deliver power to the processor in response to an assertion of the power off signal.

10. The system of claim 9, wherein the power supply device is a voltage regulator module.

11. The system of claim 9, further comprising reset logic to cause the system reset in response to the assertion of the thermal trip signal.

12. The system of claim 11, the reset logic to cause the system reset in response to the assertion of the thermal trip signal after a predetermined period of time had elapsed following the assertion of the thermal trip signal.

13. The system of claim 11, the reset logic to cause the system reset in response to the assertion of the thermal trip signal after the processor has cooled to a predetermined temperature.

* * * * *